May 2, 1967 KIYOSHI INOUE 3,317,810
BATTERY-CHARGING APPARATUS AND METHOD
Filed May 5, 1964
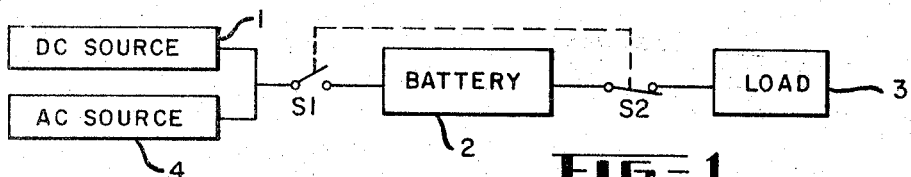
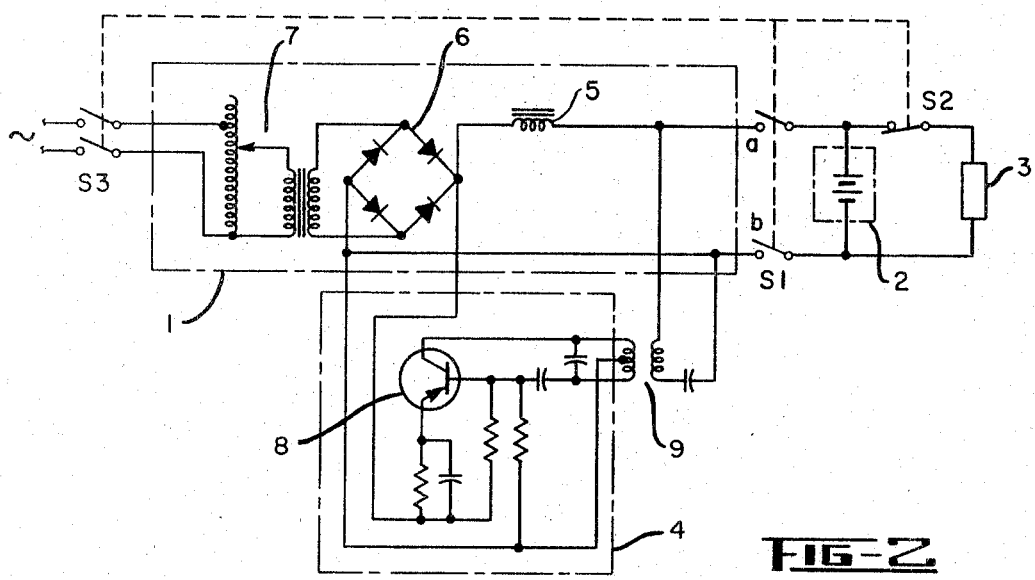
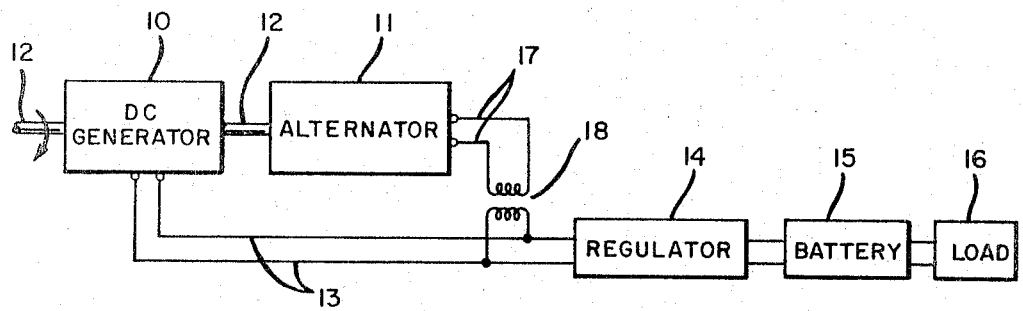
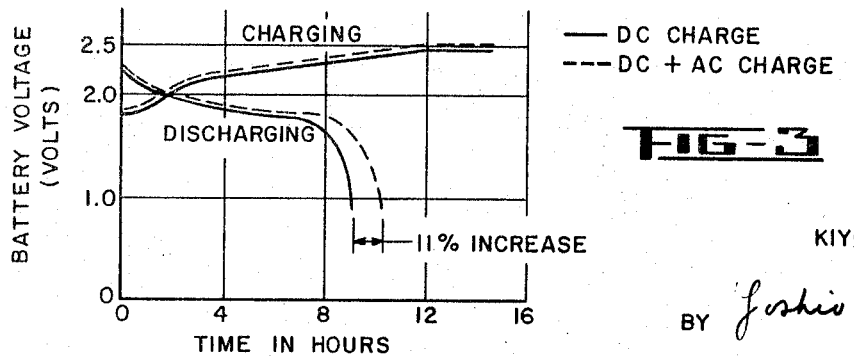
INVENTOR.
KIYOSHI INOUE
BY *Joshio Katayama*
ATTORNEY United States Patent Office 3,317,810
Patented May 2, 1967

3,317,810
BATTERY-CHARGING APPARATUS AND
METHOD
Kiyoshi Inoue, 182 Yoga Tamagawa, Setagaya-ku,
Tokyo, Japan
Filed May 5, 1964, Ser. No. 364,900
Claims priority, application Japan, May 27, 1963,
38/27,306; June 13, 1963, 38/30,133
5 Claims. (Cl. 320—56)

This invention relates to the transfer of chemical and electrical energies as derived by electrolytic action between two electrodes in an electrolyte, and more particularly to an improved apparatus for and method of charging wet or dry battery cells (operating with liquid or gel electrolytes).

The efficiency of present day battery cells is limited as a result of the grouping of static ionic charges in the vicinity of the electrodes. This action, known as polarization effect, reduces the amount of active material in the electrodes that is raised to the charged state, and consequently lowers the capacity of the cell to store a charge.

In accordance with this invention, electrode efficiency is markedly improved for a unidirectional discharging battery or a reversible charging and discharging battery when, during charging, an alternating current, preferably ranging between 100 cycles per second and 100 kilocycles per second, is superimposed upon the direct charging current. The increase in electrode efficiency is believed to be due to a depolarization or dispersal of static ionic charges in the vicinity of the electrodes, resulting in greater utilization of active electrode material. With alternating current superimposed on direct charging current, it was observed that no appreciable change in terminal voltage occurred during the charging period, but on completion of the charging cycle, terminal voltage rose rapidly.

An object of this invention is the provision of a system and method for charging batteries to increase electrode efficiency and thus the amount of charge capacity of the battery.

Another object is the provision of a system and method of charging a battery whereby to markedly increase the charge-discharge current density without appreciably affecting battery capacity or electrode efficiency.

Other objects of the invention will become apparent from the following description of preferred embodiments thereof, reference being had to the accompanying drawings in which:

FIGURE 1 is a block diagram of apparatus used in the practice of the invention;

FIGURE 2 is a schematic circuit diagram of battery charging apparatus embodying the invention;

FIGURE 3 shows voltage-time curves which compare charging and discharging characteristics of a conventionally charged battery with a battery charged in accordance with the invention; and FIGURE 4 is a block diagram of an automobile battery charging system embodying this invention.

Referring to the drawings, an embodiment of the invention is shown in FIGURE 1 as a direct current (D.C.) source 1, such as a charger, electrically connected by switch S1 to a battery 2 which in turn is electrically connected by switch S2 to a load 3. When switch S2 is closed to discharge the battery through load 3, charging switch S1 is open, and for this purpose the switches mechanically interlinked as suggested by the broken line. In accordance with the invention, an alternating current (A.C.) source or generator 4 is connected to the output of D.C. source 1 and superimposes an alternating current on the direct charging current applied to battery 2 when switch S1 is closed during the charging cycle. The A.C. source preferably has an output frequency range of 100 cycles per second to 100 kilocycles per second, and may be a suitable electronic oscillator or a mechanically driven alternator.

A circuit diagram of an electronic charging system embodying the invention is shown in FIGURE 2. The D.C. source 1 comprises a full-wave silicon rectifier 6 connected to the output of transformer 7 which is energized by a power source through switch S3. The output of rectifier 6 is filtered through choke coil 7 and is applied to the terminals $a$ and $b$ of switch S1 as well as to oscillator 4 to energize the latter. Oscillator 4 utilizes a transistor 8 and has an output inductively coupled by coupling transformer 9 to the output of rectifier 6 between the latter and terminals $a$ and $b$ of switch S1. The circuit parameters of the oscillator are selected to provide an output frequency in the desired range.

When switch S3 closes to initiate the charging of battery 2, switch S1 also closes and switch S2 opens to disconnect load 3 from the battery. Oscillator 4 is energized and its A.C. output is coupled by transformer 9 to the output lines of the rectifier. Battery 2 is therefore charged with a direct charging current on which an alternating current from the oscillator is superimposed. When battery 2 is fully charged, switches S1 and S3 are opened and the battery is reconnected to the load through switch S2.

FIGURE 3 shows a comparison of the charging and discharging terminal voltages of a lead storage battery, rated at 16 ampere-hours, when charged only by direct current of 5 amperes, and when charged with direct current of 5 amperes and superimposed alternating current at 0.07 volt, 1.7 amperes and 60 kilocycles per second. The no-load voltage in both instances was 2.5 volts. It will be noted that the discharge time of the battery was increased by 11% when it was charged with the combined D.C. and A.C. charging current.

Another embodiment of the invention is illustrated in FIGURE 4 as the battery charging system in a motor vehicle having a D.C. generator 10 and alternator 11 rotated by a common shaft 12 driven by the vehicle crankshaft. The D.C. output of generator 10 on lines 13 is applied to the regulator 14 which controls the charging of battery 15 to which the vehicle load circuit 16 is connected. The A.C. output of alternator 11 on lines 17 is inductively coupled to the D.C. generator output lines 13 by coupling transformer 18. Battery 15 is thus charged with a direct current and a superimposed alternating current. Alternatively, the armature of the D.C. generator may be notched so that a succession of alternating current pulses is produced during each rotation of the armature, the induced alternating current being tapped off the armature and connected across the D.C. output terminals of the device by a coupling transformer.

Other examples of the beneficial results derived from the practice of this invention are:

*Example 1*

A three-plate lead-acid battery with a capacity of 5 ampere-hours (having a central lead-oxide plate flanked by two lead plates spaced apart by a distance of 0.5 cm.) is employed using wood-lattice separators in a conventional manner with about 450 cc. of sulfuric acid ($H_2SO_4$) electrolyte (specific gravity 1.23). The rectangular plates had a height of 12 cm. and a width of 5 cm. When the plates were charged at 1 ampere with a current density of approximately 5 ma./cm.$^2$ for a period of 10 hours, and discharged at 1 ampere, the battery charged without a superimposed high frequency showed an electrode efficiency of approximately 67–74%, this being the percentage of the electrode material calculated to have been charged as compared with the quantity of active material present.

When an alternating current of 60 kc./sec. was supplied during charging at a current of 0.2 ampere, the electrode efficiency rose to 85–98%.

*Example II*

Using an ordinary battery, as outlined in Example I, the charging current density was increased 1000 times (5 amp./cm.$^2$). After 3 successive charge-discharge cycles, the capacity of the battery was reduced to about ⅔ the original capacity, and likewise, the electrode efficiency was reduced to approximately 45%. However, when high frequency alternating current was superimposed under the same conditions outlined above, there was no apparent loss in capacity and the electrode efficiency rose to 78–80% after three charge-dicharge cycles as described. Therefore, according to this invention, it is possible to greatly increase the charge-discharge current density without appreciably affecting battery capacity or the electrode efficiency.

*Example III*

A conventional manganese oxide-carbon-zinc dry cell (1.5 volts) fresh from the shelf was discharged at 250 ma., the discharge lasting for 11 hours. When, prior to discharge, a high frequency alternating current (60 kc./sec.) was applied to the cell for 2 hours, the discharge at 250 ma. lasted 12.5 hours.

What is claimed is:

1. Apparatus for charging a battery comprising
a source of direct current having an output connectable to the terminals of the battery for charging same,
means for separately generating an alternating current having a frequency greater than 100 cycles per second and less than 60 kilocycles per second, and
inductive coupling means for coupling the output of the alternating current generating means to the output of the direct current source while the latter is charging the battery.

2. Mechanism for charging the battery of a motor-driven vehicle comprising
a D.C. generator having a direct current output electrically connectable to the terminals of the battery for charging same,
means for generating an alternating current electrically independently of said D.C. generator,
means for mechanically driving said D.C. generator and said alternating current generating means by the motor of the vehicle, and
means for inductively coupling the alternating current output of said generating means to the output of said D.C. generator whereby an alternating current is superimposed on the battery charging current.

3. The apparatus according to claim 1 in which said source of direct current comprises a full wave rectifier.

4. The apparatus according to claim 3 in which the frequency of said alternating current is 60 kilocycles per second.

5. The method of charging a battery consisting of the steps of
generating a direct charging current for application to the terminals of a battery to be charged,
separately generating an alternating current having a frequency of approximately 60 kilocycles per second, and
inductively coupling the alternating current to terminals of the battery.

References Cited by the Examiner

UNITED STATES PATENTS

| | | | |
|---|---|---|---|
| 2,752,550 | 6/1956 | Beer | 320—4 |
| 2,935,675 | 5/1960 | Ferguson et al. | 320—4 |

OTHER REFERENCES

Dry Cells Can Be Reactivated, Hallows, Radio Electronics, December 1956, p. 49, TK 6540. R24.

JOHN F. COUCH, *Primary Examiner.*

S. WEINBERG, *Assistant Examiner.*